United States Patent
Kawahara

Patent Number: 6,158,026
Date of Patent: Dec. 5, 2000

[54] SCRAMBLING APPARATUS, METHOD THEREOF, DESCRAMBLING APPARATUS, AND METHOD THEREOF

[75] Inventor: Minoru Kawahara, Kanagawa, Japan

[73] Assignee: Sony Corporation, Tokyo, Japan

[21] Appl. No.: 09/102,737

[22] Filed: Jun. 22, 1998

[30] Foreign Application Priority Data

Jun. 26, 1997 [JP] Japan ..................... 9-170011

[51] Int. Cl.[7] .................. G06F 11/00; H04N 7/167
[52] U.S. Cl. ......................... 714/701; 380/210
[58] Field of Search ................ 714/781–789, 714/701; 380/28, 33, 46, 47, 268, 210, 213–217; 341/50, 93

[56] References Cited

U.S. PATENT DOCUMENTS

| | | | |
|---|---|---|---|
| 3,808,536 | 4/1974 | Reynolds | 380/45 |
| 5,267,316 | 11/1993 | Merino Gonzalez et al. | 380/28 |
| 5,471,531 | 11/1995 | Quan | 380/238 |

*Primary Examiner*—Emmanuel L. Moise
*Attorney, Agent, or Firm*—Frommer Lawrence & Haug, LLP; William S. Frommer

[57] ABSTRACT

A G circuit is based on a matrix of a generated polynomial for generating an M sequence of eight degrees. The matrix is squared and thereby a $G^2$ circuit is obtained. 16-bit data is divided into high order eight bits and low order eight bits. The high order eight bits and the low order eight bits are supplied to first input terminals of two Ex-OR circuits. At first, a terminal is selected so that ID of data is extracted. The G circuit and the $G^2$ circuit designate the start point of the M sequence. Next, a terminal is selected so that output data of the $G^2$ circuit is fed back. Output data of the $G^2$ circuit 113 and the G circuit are supplied to the second input terminals of the Ex-OR circuits. In each of the two Ex-OR circuits, data supplied to the first input terminal and the second input terminal is Ex-ORed. Thus, data of 16 bits is descrambled.

4 Claims, 18 Drawing Sheets

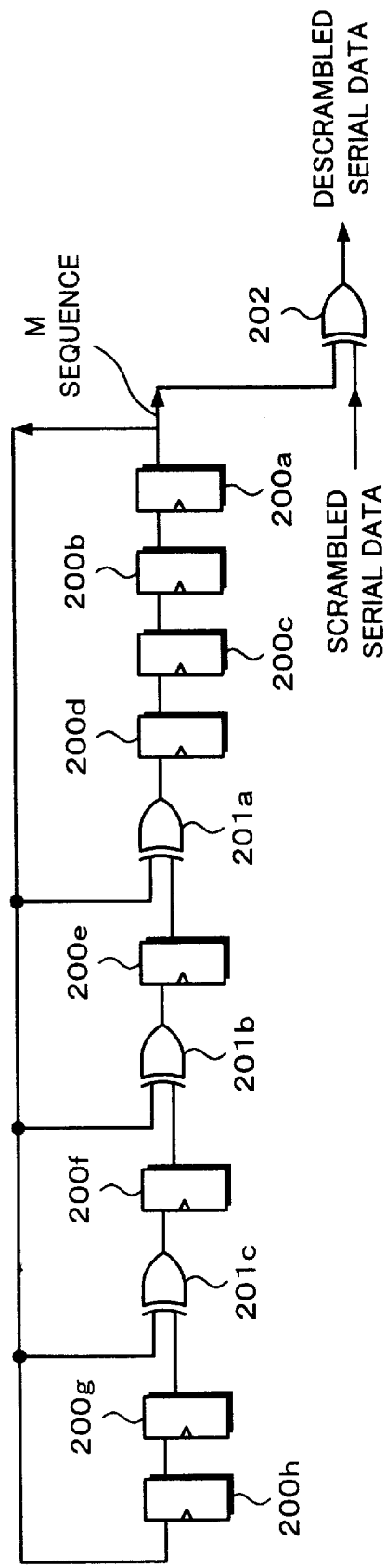

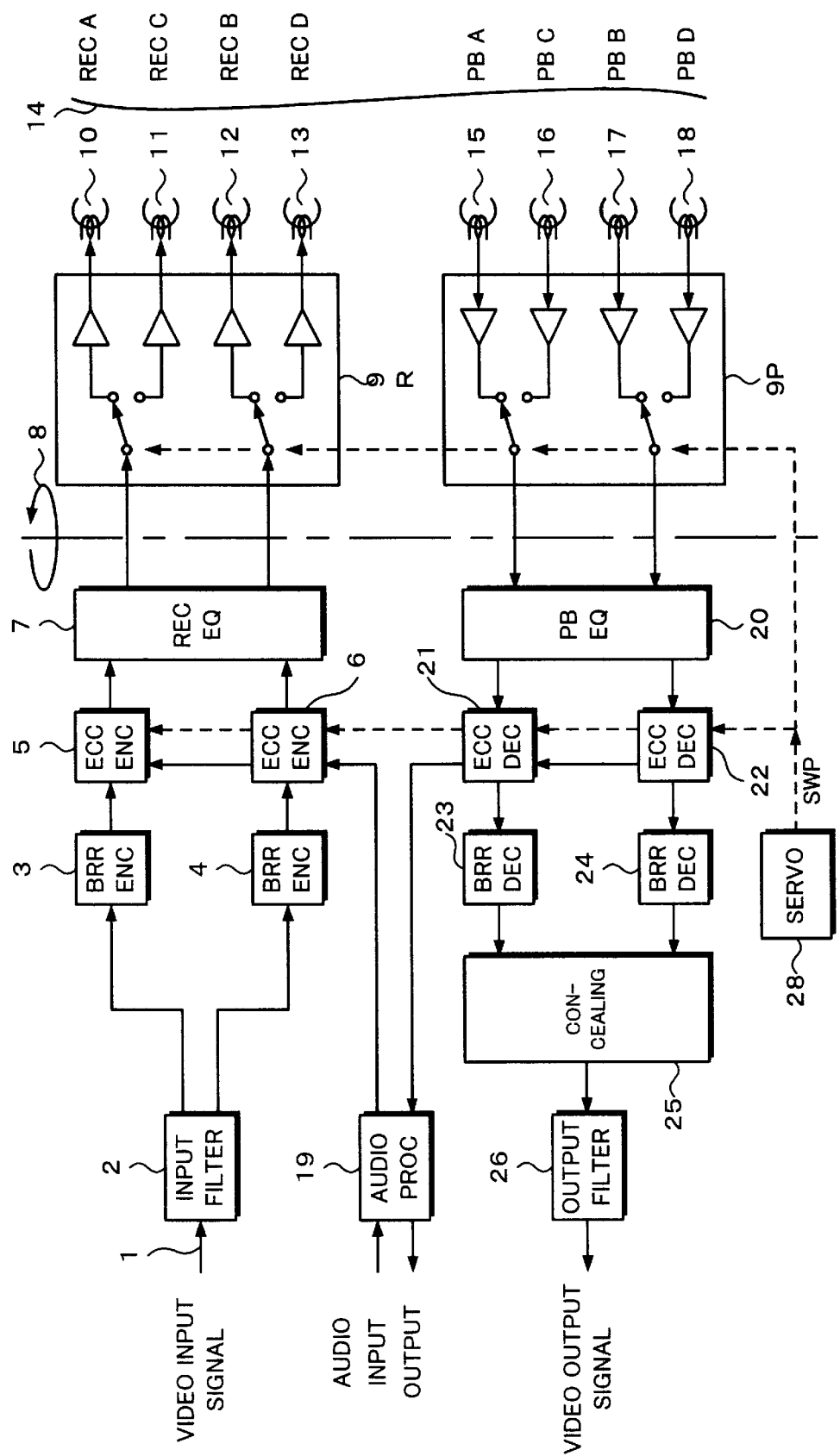

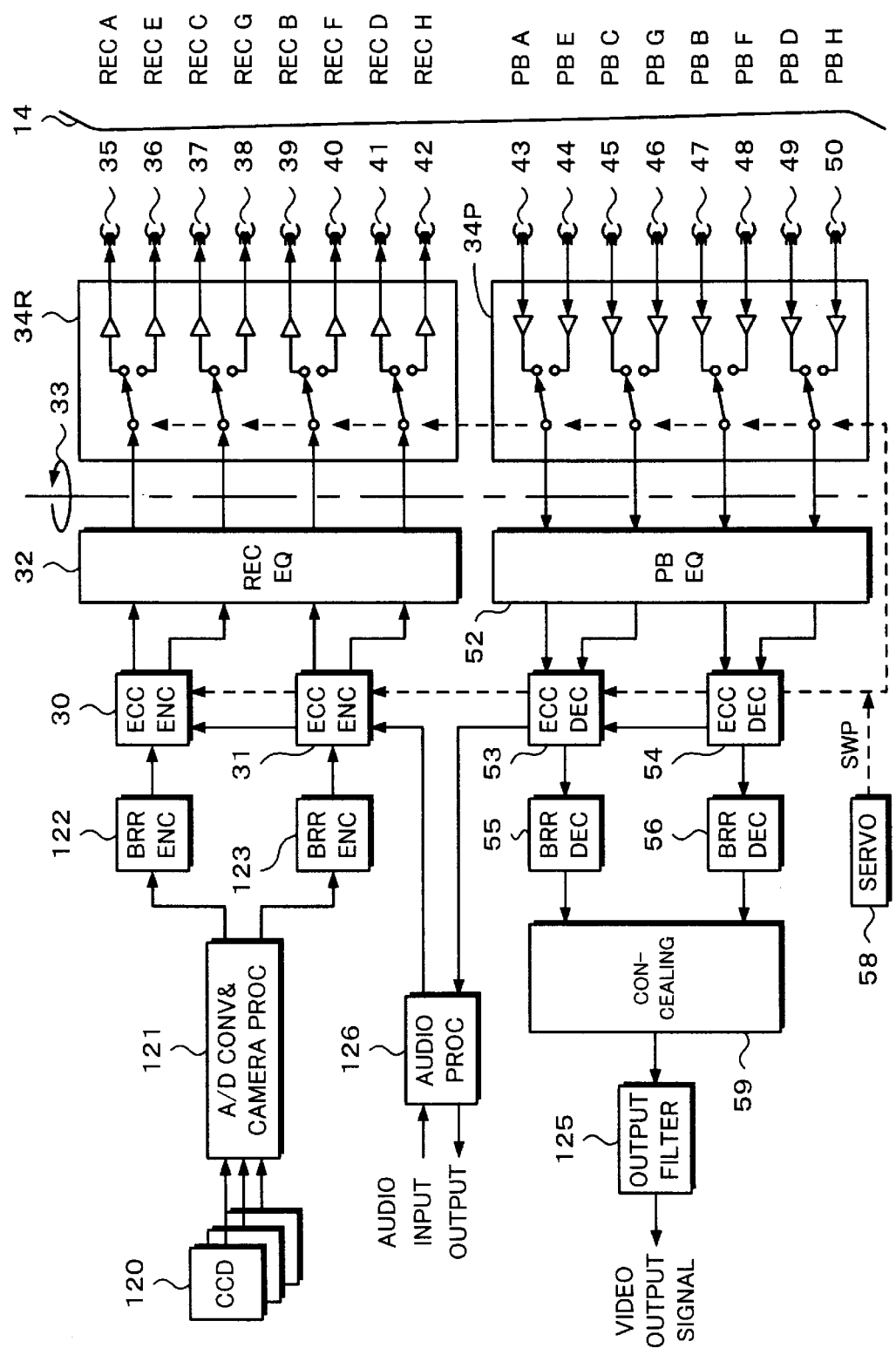

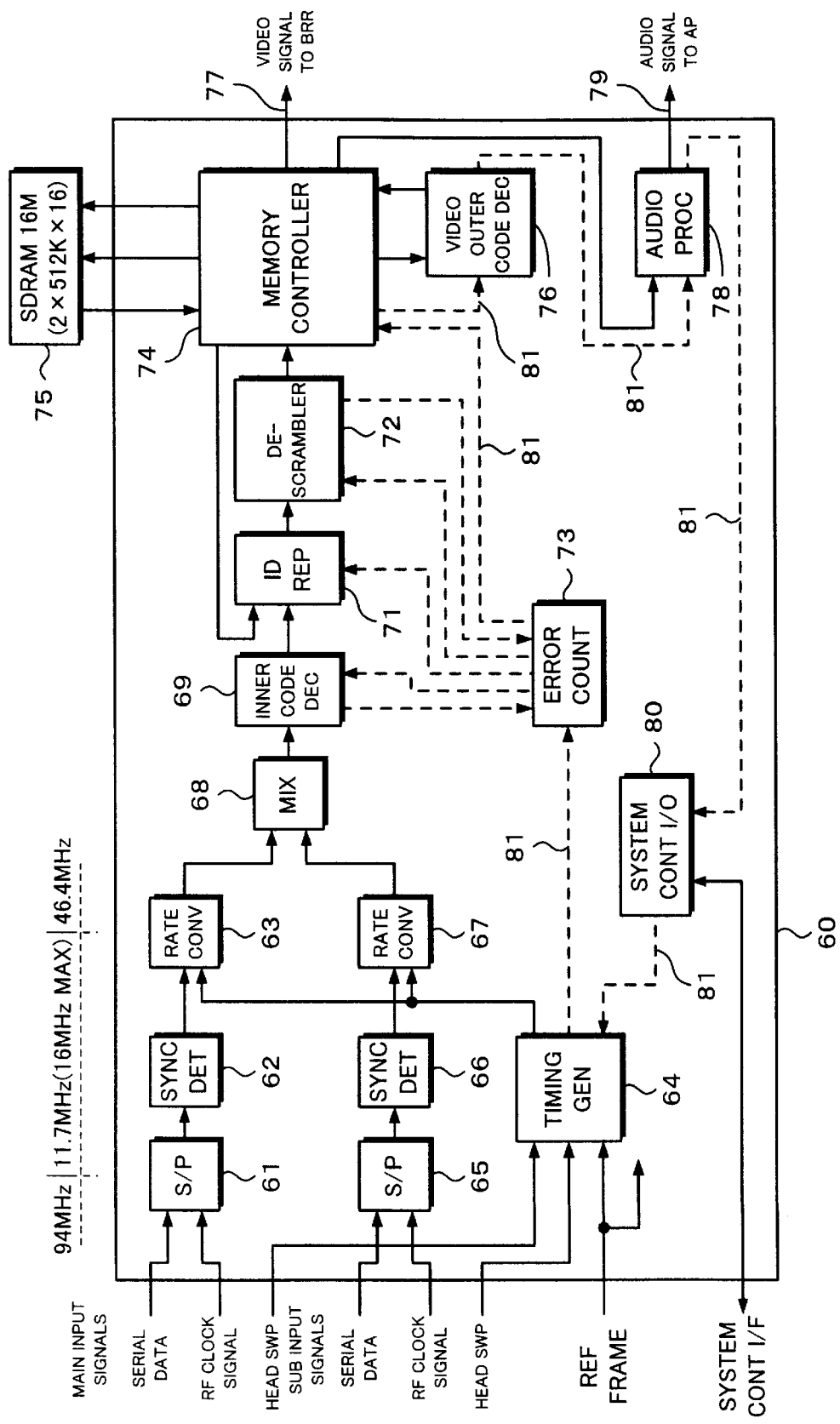

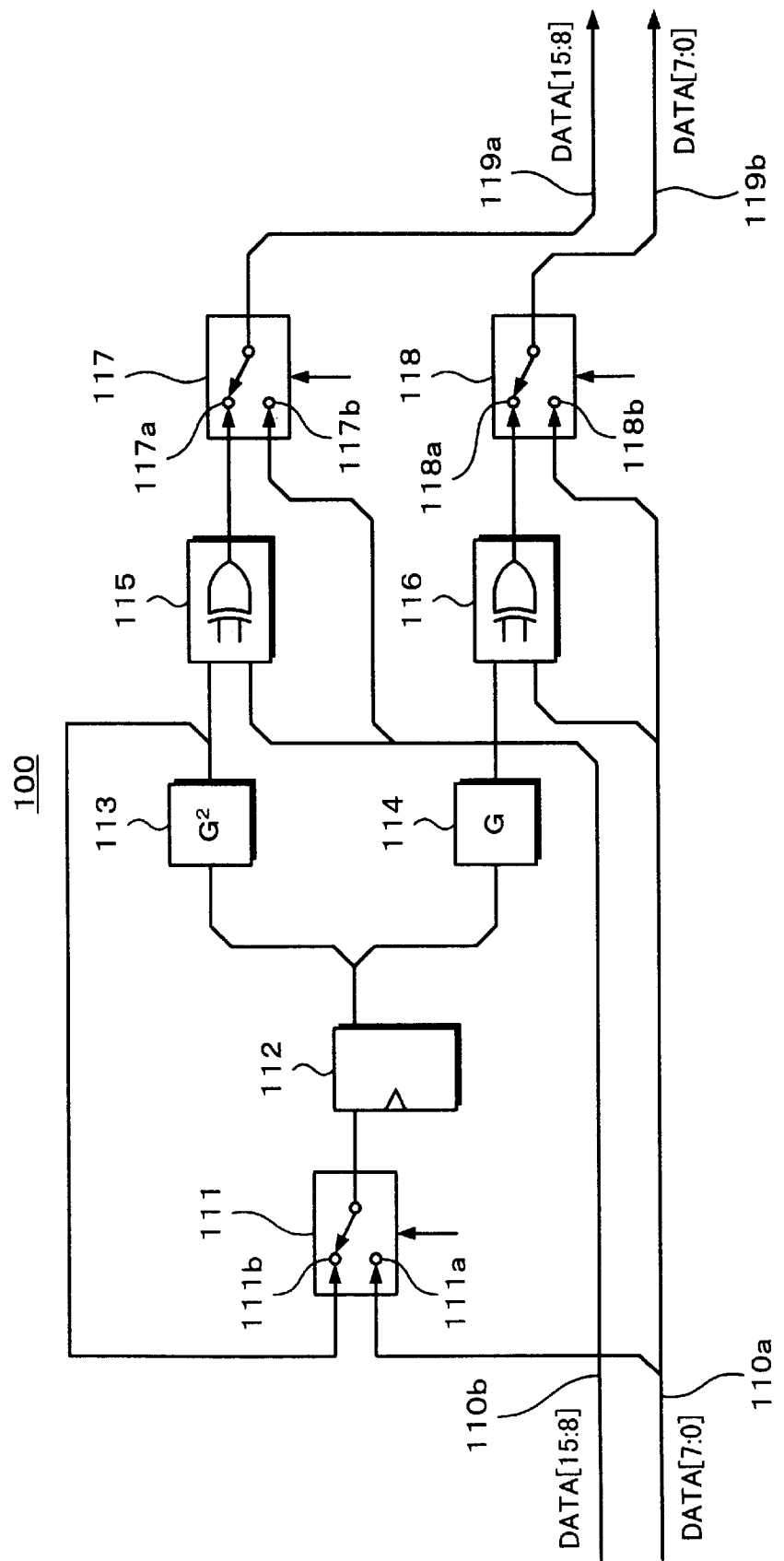

SCRAMBLING APPARATUS, METHOD THEREOF, DESCRAMBLING APPARATUS, AND METHOD THEREOF

BACKGROUND OF THE INVENTION

1. Field of the Invention

The present invention relates to a scrambling apparatus, a descrambling apparatus, and methods thereof for performing a scrambling/descrambling process corresponding to M sequence with 16 bits in parallel.

2. Description of the Related Art

In a signal processing apparatus that processes a video signal in a digital format, for example, a digital VCR (Video Cassette Recorder) that records/reproduces a high resolution video signal, an input video signal is compression-encoded. The compression-encoded video signal is recorded to for example a video tape. To record/reproduce a video signal at high data rate, a helical scanning recording/reproducing apparatus is known. In the helical scanning recording/reproducing apparatus, the magnetic tape is diagonally wound on a rotating drum. Magnetic heads are disposed on the rotating drum. In this apparatus, data is successively recorded on the magnetic tape so that diagonal tracks are formed on the magnetic tape.

For example, data as a digital video signal is compression-encoded and then encoded with error correction code. The error-correction-code encoding process is often performed with for example product code. In this process, data of a matrix as symbols (for example, bytes) is encoded in the row direction with for example Reed Solomon code. Thus, an outer code parity is generated. In addition, the data and outer code parity are encoded in the line direction. Thus, an inner code parity is generated. In such a manner, with the outer code parity in the row direction and the inner code parity in the line direction, the error-correction-code encoding process is performed with product code. At this point, the time sequence of the data accords with for example the line direction.

Data for one line in the direction of the inner code is equivalent to one sync block. An error correction encoder that performs the error correction code encoding process adds an identification (ID) signal to each sync block.

The resultant data is recorded on the magnetic tape through an equalizer, a recording amplifier, and so forth. At this point, the data is recorded in the above-described helical scanning system. In addition, the data is recorded in azimuth system. In the azimuth system, with a set of recording magnetic heads that have different azimuth angles, data is recorded in such a manner that the azimuth angles of adjacent two tracks are different. A plurality of sync blocks are recorded on one track. Each track has a plurality of video sectors and a plurality of audio sectors.

A reproducing magnetic head reads data from the magnetic tape. Output data of the reproducing magnetic head is supplied to a reproducing amplifier and an equalizer. Thus, the resultant data is obtained as reproduced data. The reproduced data is supplied to an ECC (Error Correcting Code) decoder. The ECC decoder treats data of for example one sync block as one packet and decodes reproduced data corresponding to an ID designated to each packet.

The reproduced data is written to an RAM connected to the ECC decoder. The reproduced data is read in the direction of the inner code. Thus, an error of the reproduced data is corrected with the inner code (this process is referred to as inner code error correcting process). Next, to correct an error of the reproduced data with the outer code (this process is referred to as outer code error correcting process), the reproduced data that has been corrected with the inner code is rewritten to the RAM. In the RAM, the reproduced data is written as packets to addresses corresponding to IDs designated to the packets.

The reproduced data written to the RAM is read in the order of addresses. Thus, errors of the packets are corrected with the outer code. At this point, there may be a packet whose error has not been corrected with the inner code. In this case, the ID of the packet is unreliable. Thus, a packet cannot be written to a correct address of the RAM. Thus, the error of the packet may not be corrected with the outer code.

To solve such a problem, after performing the inner code error correcting process for each packet, the ECC decoder reproduces an ID thereof. For example, the ECC decoder predicts the ID of the packet that has an error with reference to adjacent packets thereof and replaces the ID of the error packet with the predicted ID. Thus, a packet that has been determined as an error packet in the inner code error correcting process can be correctly used in the outer code error correcting process.

The resultant data is rewritten to the RAM. The data that has been written to the RAM is read in the direction of the inner code. Thus, data in the time sequence is obtained. Data that is output from the ECC decoder is decompressed.

In such a digital VCR, to disperse the deviation of the record frequency of successive "0s" and "1s" and repetitive pattern data, when a signal is recorded, it is scrambled. Thus, the distribution of the record frequency is flattened. In the scrambling process, random numbers referred to as M sequence is used. The M sequence is generated by a circuit equivalent to the following primitive polynomial.

$$X^8+X^4+X^3+X^2+1 \tag{1}$$

When such data is reproduced, it should be descrambled. The descrambling process is preceded by the inter code correcting process. FIG. 1 is a block diagram showing a circuit that generates random numbers of the M sequence corresponding to Formula (1) and performs the descrambling process. The circuit equivalent to Formula (1) is composed of a plurality of flip-flops 200a to 200h and a plurality of Ex-OR gates 201a to 201c.

The flip-flop 200a serially outputs random numbers of the M sequence. The random numbers of the M sequence that are output from the flip-flop 200a are supplied to one input terminal of the Ex-OR gate 202. Serial data to be descrambled is supplied to the other input terminal of the Ex-OR gate 202. The Ex-OR gate 202 Ex-ORs the serial data and the random numbers of the M sequence and outputs descrambled data.

The descrambling process and the scrambling process can be accomplished by the same structure.

In the structure shown in FIG. 1, since data is processed at data rate of serial data, the operation frequency becomes high. To suppress the operation frequency from becoming high, the descrambling process is performed with eight bits in parallel by a circuit (shown in FIG. 2A) equivalent to a generated polynomial given by FIG. 2B. In the circuit shown in FIG. 2A, each connection line has a data width of a plurality of bits. Ex-OR gates 210a to 210h have respective input terminals. The circuit shown in FIG. 2A generates a fixed pattern that is output from the flip-flop 200a shown in FIG. 1 eight times at a time. In this case, the scrambling process and the descrambling process are performed by the same circuit. The start position of the M sequence is supplied to an input terminal 211. The output data of an output terminal 212 and data to be descrambled are ex-ORed.

In the circuit shown in FIG. 2A, the data width is eight bits. Thus, this circuit cannot be applied for a unit that operates with data of 16 bits wide. When the data width is converted from 16 bits to eight bits, the circuit shown in FIG. 2A can be used. However, since the data rate is doubled, it may be difficult from a viewpoint of process speed.

OBJECTS AND SUMMARY OF THE INVENTION

Therefore, an object of the present invention is to provide a scrambling apparatus, a descrambling apparatus, and methods thereof that allow data of 16 bits wide to be scrambled and descrambled.

A first aspect of the present invention is a scrambling apparatus for preforming a scrambling process corresponding to M sequence, comprising a means for squaring a first matrix of a generated polynomial for generating the M sequence of n degrees, obtaining the result as a second matrix, and treating the M sequence as data of 2n bits wide with the second matrix.

A second aspect of the present invention is a descrambling apparatus for preforming a descrambling process corresponding to M sequence, comprising a means for squaring a first matrix of a generated polynomial for generating the M sequence of n degrees, obtaining the result as a second matrix, and treating the M sequence as data of 2n bits wide with the second matrix.

A third aspect of the present invention is a scrambling method for preforming a scrambling process corresponding to M sequence, comprising the step of squaring a first matrix of a generated polynomial for generating the M sequence of n degrees, obtaining the result as a second matrix, and treating the M sequence as data of 2n bits wide with the second matrix.

A fourth aspect of the present invention is a descrambling method for preforming a descrambling process corresponding to M sequence, comprising the step of squaring a first matrix of a generated polynomial for generating the M sequence of n degrees, obtaining the result as a second matrix, and treating the M sequence as data of 2n bits wide with the second matrix.

As described above, according to the present invention, a first matrix of a generated polynomial for generating an M sequence of n degrees is squared and thereby a second matrix is obtained. With the second matrix, the M sequence is treated as data of 2n bits wide. Thus, with the M sequence of eight degrees, data of 16 bits wide can be scrambled/descrambled.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a block diagram showing an example of the structure of a descrambling circuit according to a primitive polynomial;

FIG. 3 is a block diagram showing an example of the structure of a recording/reproducing system of a four-head type digital VCR according to the present invention;

FIG. 4 is a block diagram showing an example of the structure of a recording/reproducing system of an eight-head type digital VCR according to the present invention;

FIG. 8 is a block diagram showing an example of the structure of an IC circuit of an ECC decoder;

FIG. 18 is a schematic diagram showing an example of the structure of a circuit for treating an M sequence with 16 bits.

DETAILED DESCRIPTION OF THE PREFERRED EMBODIMENTS

Figures 2A, 2B:
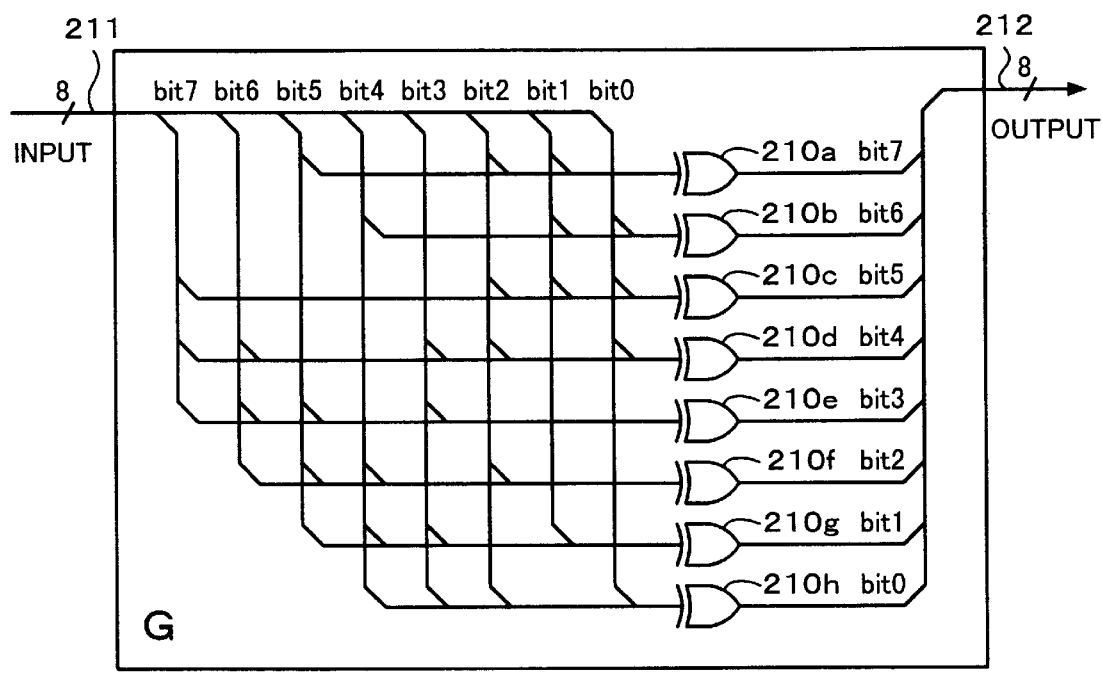
FIG. 2A is a schematic diagram showing a G circuit for generating an M sequence with eight bits in parallel corresponding to a generated polynomial G.
FIG. 2B is a schematic diagram showing the generated polynomial G.

Next, with reference to the accompanying drawings, embodiments of the present invention will be described. For easily understanding, the structure of a digital VCR according to the present invention will be described. The digital VCR records a high resolution video signal to a magnetic tape and reproduces a high resolution video signal from a magnetic tape. FIG. 3 shows an example of the structure of a recording/reproducing system of the digital VCR. The recording/reproducing system shown in FIG. 3 is a four-head system having four recording heads and four reproducing heads.

In FIG. 3, a high resolution digital video signal is supplied to a video input terminal 1. The digital video signal is supplied to an input filter 2. The input filter 2 performs a filtering process that compresses a (4:2:2) signal into a (3:1:1) signal. In addition, the input filter 2 changes the frequency of a clock signal from 74.25 MHz into 46.40625 MHz.

In addition, the input filter 2 converts the (3:1:1) signal into data of two channels. The data of each channel has a data rate of 46.40625 MHz. The data of each channel is supplied to a BRR (Bit Rate Reduction) encoder 3 or 4 and an error correction encoder (ECC encoder) 5 or 6. The BRR encoders 3 and 4 perform a compression-encoding process. The ECC encoders 5 and 6 perform an error correction code encoding process.

In this example, each of the BRR encoders 3 and 4 adaptively selects an intra-field compressing process or an intra-frame compressing process and shuffles data as DCT blocks. When a picture largely moves in fields, a DCT block is composed of data in fields. When a picture does not largely move in fields, a DCT block is composed of data in a frame. Each of the BRR encoders 3 and 4 selects the intra-field compression-encoding process or the intra-frame compression-encoding process for each frame.

Each of the ECC encoders 5 and 6 performs a product code encoding process and generates record data that is a sequence of sync blocks. Each of the ECC encoders 5 and 6 performs outer code encoding process and adds an ID portion (that includes a relevant sync block number and various flags) to each sync block to be recorded on the tape. Thereafter, each of the ECC encoders 5 and 6 performs an inner code encoding process. The encoding range of the inner code encoding process includes the ID portion. One sync block is composed of the inner code parity and a sync signal that represents the beginning of the sync block. One sync block is the minimum recording/reproducing data unit.

Output data of each of the ECC encoders 5 and 6 is supplied to a recording equalizer 7. The record data of two channels is supplied to a record head driver 9R through a rotating transformer 8. The record head driver 9R has a switching circuit that selects a recording amplifier and a head to which the record signal is supplied. The record head driver 9R is connected to recording heads 10, 11, 12, and 13. The recording heads 10, 11, 12, and 13 record data to the magnetic tape 14.

Next, the structure of the reproducing side will be described. A signal recorded on the magnetic tape 14 is reproduced by reproducing heads 15, 16, 17, and 18. The reproduced signals are supplied to a reproducing head driver 9P. The reproducing head driver 9P outputs reproduced signals of two channels. The reproduced signals are supplied to a reproducing equalizer 20 through the rotating transformer 8. The reproducing equalizer 20 reproduces and equalizers the signals received from the reproducing head driver 9P and outputs reproduced serial data of two channels. In addition, the reproducing equalizer 20 generates a clock signal in synchronization with the reproduced signals. The clock signal is supplied to ECC decoders 21 and 22 along with the reproduced serial data.

The output signals of two channels are supplied from the reproducing equalizer 20 to the ECC decoders 21 and 22. Each of the ECC decoders 21 and 22 detects synchronization of the input data, changes the frequency of the input data from the record rate to the system clock, and corrects various errors that have taken place on the tape. In other words, each of the ECC decoders 21 and 22 performs an inner code error correcting process. The inner code is complete in each sync block. When an error can be corrected with inner code, the error is corrected. Otherwise, an error flag is set at the error position. Thereafter, each of the ECC decoders 21 and 22 performs an outer code error correcting process. With reference to the error flag, each of the ECC decoders 21 and 22 performs an erasure correcting process. Although most errors are corrected by the outer code error correcting process, if a long error in the longitudinal direction of the tape takes place, the error may not be corrected. At the point, the error is detected within the detecting capability of the outer code. An error flag is set at the position of the error word.

Each of the ECC decoders 21 and 22 outputs data as sync blocks with a clock signal of 46.40625 MHz and outputs a word error flag. The ECC decoders 21 and 22 supply respective output data to BRR decoders 23 and 24, respectively. Each of the BRR decoders 23 and 24 performs a variable-length code decoding process, an inverse DCT process, and a deshuffling process so as to decode compressed data. In addition, each of the BRR decoders 23 and 24 performs an intra-field decoding/intra-frame decoding process corresponding to the intra-field encoding/intra-frame encoding process performed in the BRR encoders 23 and 24.

Output signals of the BRR decoders 23 and 24 are supplied to a concealing circuit 25 along with a concealing error flag. The concealing circuit 25 conceals an error of a reproduced signal that exceeds the error correcting capability of the ECC decoders 21 and 22. The concealing circuit 25 for example interpolates a lost portion of data that has not been error-corrected. For example, when decompressing data, each of the BRR decoders 23 and 24 determines at what degree a DCT coefficient has an error corresponding to the word error flag that has been set at the error position. When an error has taken place in a DC coefficient or an AC coefficient of a lower degree, each of the BRR decoders 23 and 24 does not decode the DCT block, but sends a conceal flag to the concealing circuit 25. Thus, the concealing circuit 25 interpolates the DCT block.

An output signal of the concealing circuit 25 is supplied to an output filter 26. The output filter 46 changes the clock frequency from 46.40625 MHz to 74.25 MHz. In addition, the output filter 46 converts (3:1:1) signals of two channels into a (4:2:2) signal and outputs the resultant signal as a reproduced video signal.

An audio processor 19 processes input audio data in a predetermined manner and supplies the resultant data to the ECC decoders 5 and 6. As with video data, each of the ECC decoders 5 and 6 performs a product code encoding process for audio data of one channel to be recorded on one track. When audio data is reproduced, it is output from the ECC decoders 21 and 22. The output data is processed by the audio processor 19.

The recording heads 10 to 13 are disposed on a rotating drum that rotates at for example 90 Hz. A pair of the recording heads 10 and 12 are disposed at adjacent positions. Likewise, a pair of the recording heads 11 and 13 are disposed at adjacent positions. The azimuth angle of the recording head 10 is different from the azimuth angle of the recording head 12. Likewise, the azimuth angle of the recording head 11 is different from the azimuth angle of the recording head 13. The recording heads 10 and 11 are disposed on the rotating drum at an interval of 180°. The azimuth angle of the recording head 10 is the same as the azimuth angle of the recording head 11. In addition, the reproducing heads 15, 16, 17, and 18 are disposed on the rotating drum. The relation of the positions and azimuth angles of the reproducing heads 15, 16, 17, and 18 are the same as those of the recording heads 10, 11, 12, and 13.

The magnetic tape is wound on the rotating drum at a winding angle of 180°. Data is successively recorded as diagonal tracks on the magnetic tape. The recording head driver 9R has the recording amplifiers and the switching circuit that selects a record signal in synchronization with the rotation of the heads. Likewise, the reproducing head driver 9P has the reproducing amplifiers and the switching circuit. A switching pulse SWP that synchronizes with the rotation of the heads is supplied from a servo circuit 28 as represented by dotted lines. The switching pulse SWP is supplied to the ECC encoders 5 and 6 and the ECC decoders 21 and 22.

As shown in FIG. 3, tracks corresponding to the recording heads 10, 11, 12, and 13 are denoted by A, B, C, and D, respectively. Likewise, tracks corresponding to the reproducing heads 15, 16, 17, and 18 are denoted by A, B, C, and D, respectively. The recording heads 10 and 12 generate tracks A and B, respectively, at a time. Next, the recording heads 11 and 13 generate tracks C and D, respectively, at a time. In this embodiment, record data of one frame (1/30 second) of the video signal is recorded on 12 successive tracks. Two adjacent tracks with different azimuths (on A and B channels or on C and D channels) are segmented. Thus, one frame of the video signal is composed of six segments. These six segments are designated segment numbers 0 to 5. Audio data of four channels is recorded at the center portion of each track in such a manner that the audio data of four channels is sandwiched with video data.

FIG. 4 is a block diagram showing another example of the structure of a digital VCR according to the present invention. The digital VCR shown in FIG. 4 is integrated with a video camera. The digital VCR is an eight-head system that has eight recording heads and eight reproducing heads. A CCD 120 photographs a color picture and supplies the photographed picture as an analog signal to an A/D converting and camera processor 121. The A/D converting and camera processor 121 converts the analog signal into digital video signals of two channels. The video signals are supplied to BRR encoders 122 and 123. Each of the BRR encoders 122 and 123 performs a compression-encoding process. Output signals of the BRR encoders 122 and 123 are supplied to ECC encoders 30 and 31, respectively. Each of the ECC encoders 30 and 31 divides the video signal into signals of two channels. Thus, the ECC encoders 30 and 31 form video signals of four channels. The video signals of four channels are supplied to eight recording heads 35, 36, 37, 38, 39, 40, 41, and 42 through a recording equalizer 32, a rotating transformer 33, and a recording head driver 34R. The video signals of eight channels are recorded on diagonal tracks of a magnetic tape 14 by the eight recording heads 35, 36, 37, 38, 39, 40, 41, and 42.

As with the recording heads 35, 36, 37, 38, 39, 40, 41, and 42, eight reproducing heads 43, 44, 45, 46, 47, 48, 49, and 50 are disposed. Output signals of the reproducing heads 43, 44, 45, 46, 47, 48, 49, and 50 are supplied to a reproducing head driver 34P. The reproducing head driver 34P outputs reproduced signals of four channels. The reproduced signals of four channels are supplied to a reproducing equalizer 52 through a rotating transformer 33. Output signals of the reproducing equalizer 52 are supplied to ECC decoders 53 and 54. Each of the ECC decoders 53 and 54 perform an error correcting process. Output signals of the ECC decoders 53 and 54 are reproduced data of two channels. The reproduced data of two channels is supplied to BRR decoders 55 and 56. Each of the BRR decoders 55 and 56 performs a decoding process.

A switching pulse SWP is supplied from a servo circuit 58 to the ECC encoders 30 and 31, the ECC decoders 53 and 54, the recording head driver 34R, and the reproducing head driver 34P. The servo circuit 58 controls the timings of these circuits in synchronization with the rotation of the heads.

The reproduced data of two channels decompressed by the BRR decoders 55 and 56 is supplied to a concealing circuit 59. The concealing circuit 59 interpolates an error that has not been corrected. Output data of the concealing circuit 59 is supplied to an output filter 127. The output filter 127 converts (3:1:1) signals of two channels into a (4:2:2) signal and outputs the resultant signal as an output video signal.

An audio processor 126 performs a predetermined process for the input audio data and supplies the resultant data to the ECC encoders 30 and 31. As with the video data, each of the ECC encoders 30 and 31 encodes the audio data of one channel recorded on one track with product code. When audio data is reproduced, it is output from the ECC decoders 53 and 54 to the audio processor 126. The audio processor 126 performs a predetermined process.

In the structure shown in FIG. 4, the number of recording heads and reproducing heads is twice as many as that in the structure shown in FIG. 3. In the structure shown in FIG. 4, the number of rotations of the drum is half of the structure shown in FIG. 3 so as to suppress noise. In other words, the four recording heads 35 to 38 shown in FIG. 4 have the same azimuth angles. Likewise, the four recording heads 39 to 42 have the same azimuth angle. The azimuth angle of the four recording heads 35 to 38 is different from the azimuth angle of the for recording heads 39 to 42. The recording head 35 corresponding to a track A and the recording head 36 corresponding to a track E are disposed on the rotating drum at an interval of 180°. The recording head 37 corresponding to a track C and the recoding head 38 corresponding to a track G are disposed on the rotating drum at an interval of 180°. The recording head 39 corresponding to a track B and the recoding head 40 corresponding to a track F are disposed on the rotating drum at an interval of 180°. The recording head 41 corresponding to a track D and the recoding head 42 corresponding to a track H are disposed on the rotating drum at an interval of 180°.

The recording heads 35, 37, 39, and 41 trace the magnetic tape 14 at a time. Next, the recording heads 36, 38, 40, and 42 trace the magnetic tape 14 at a time. Since the number of rotations of the drum is halved and the number of heads is doubled, the same track pattern as the four-head system is formed on the tape. Thus, the number of tracks recorded at a time is four. Consequently, record signals are recorded on four channels at a time. With the switching pulse SWP supplied from the servo circuit 58, opposite heads are selected. The relation of the reproducing heads 43 to 50 is the same as the relation of the recording heads 35 to 42.

The number of signal channels of the eight-head system shown in FIG. 4 is twice as many as that in the structure shown in FIG. 3. However, since the data rate of the structure shown in FIG. 4 is half of that of the structure shown in FIG. 3, when the number of input channels of the former is doubled, the other circuit portion of the former is the same as that of the later. In addition, the reverse azimuth circuit can be accomplished with the same circuit. Thus, the ECC decoders 21 and 22 (see FIG. 3) and the ECC decoders 53 and 54 can be accomplished with the same IC. The present invention can be applied to both the above-described four-head type digital VCR (see FIG. 3) and the eight-head type digital VCR (see FIG. 4). In the following description, the present invention will be described with respect to the four-head type digital VCR.

Figure 5:
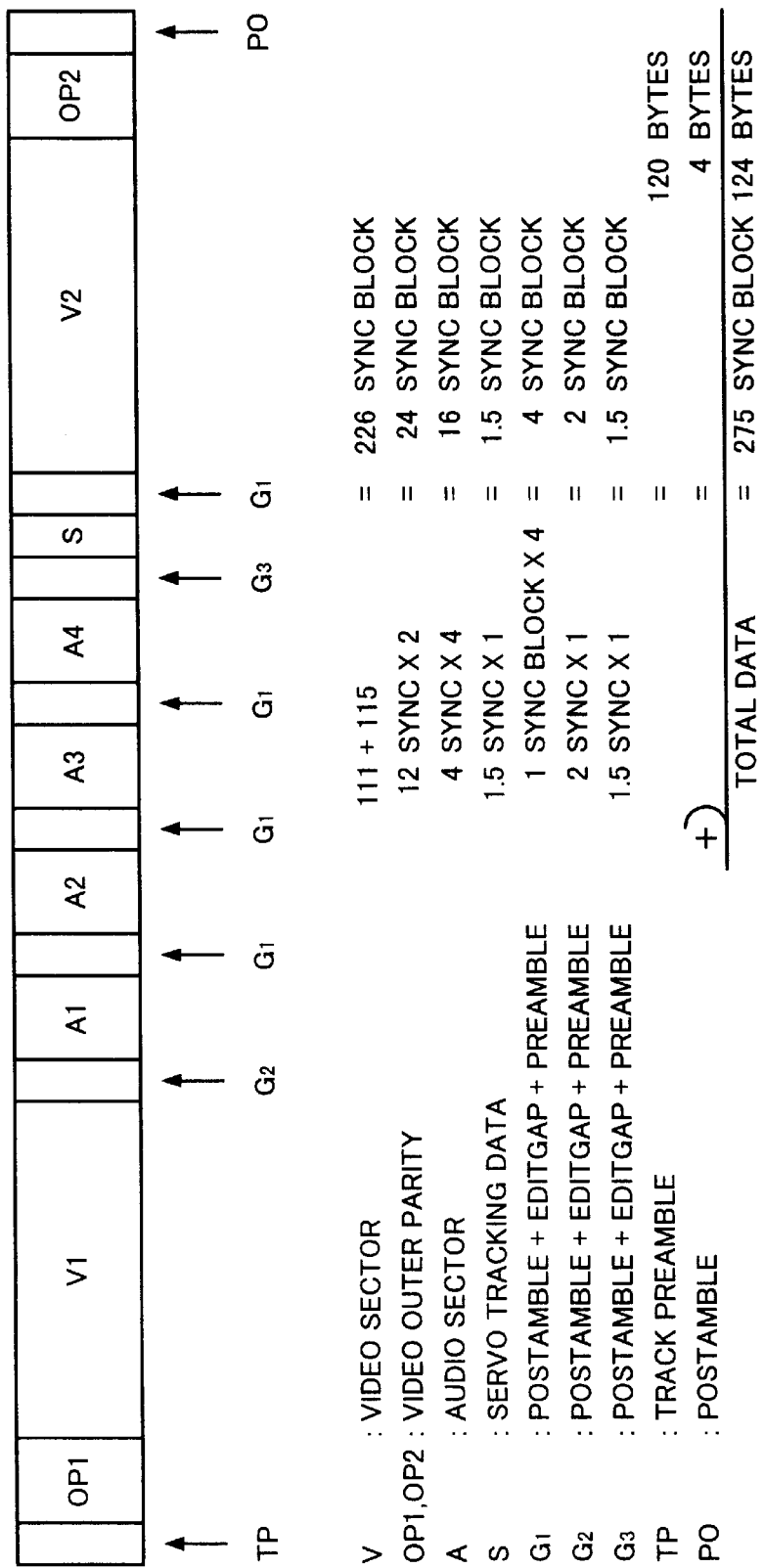
FIG. 5 is a schematic diagram showing the format of one track formed on a magnetic tape.

FIG. 5 shows the format of one track formed on a magnetic tape. Data is placed in the head tracing direction. One track is mainly composed of video sectors V1 and V2 and audio sectors A1 to A4. Each of video sectors and audio sectors is encoded with product code as a unit that video data and audio data are recorded on one track. When video data is encoded with product code, OP1 and OP2 are generated as outer code parities. When audio data is encoded with product code, an outer code parity is generated. The outer code parity is recorded in an audio sector. Each track is composed of 233 bytes that are referred to as sync blocks.

FIG. 5 shows an example of the data length of each portion recorded on one track. In this example, 275 sync blocks and data of 124 bytes are recorded on one track. The video sectors V1 and V2 are composed of 226 sync blocks. The time length of one track is around 5.6 ms. Each sector is guarded with a non-record portion. The non-record portion is referred to as edit gap. The edit gap prevents a sector to be recorded from erasing the adjacent sector.

Figure 6A:
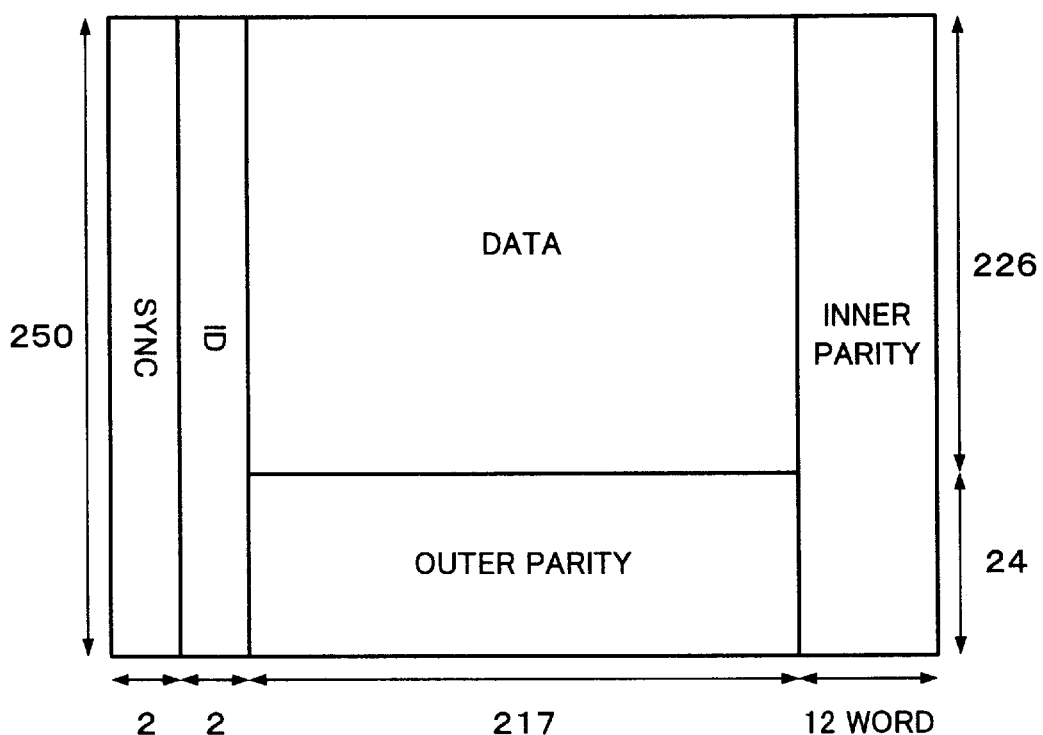
FIGS. 6A and 6B are schematic diagrams for explaining product code of error correction code.

FIG. 6A shows an example of the structure of error correction code against video data. Video data recorded on one track is encoded with error correction code at a time. In other words, video data on one track is placed in a matrix of (217×226). 226 words (one word=one byte) in the vertical direction of the matrix are encoded with (250, 226) Reed Solomon code (encoded with outer code). A 24-word outer code parity is added to the 226 words. With the outer code, a normal error correcting process for up to 10 words and an erasure correcting process for up to 24 words can be performed.

A two-word ID is added to 217 words (video data or outer code parity) in the horizontal direction of the matrix. (217+ 2=219) words in the horizontal direction of the matrix are encoded with (231, 219) Reed Solomon code (encoded with inner code). Thus, a 12-word inner code parity is generated. With the inner code, an error correcting process for up to four words is performed. In addition, an erasure flag for an error correction with outer code is generated.

Audio data is encoded with product code in the same manner as the video data although the data amount of audio data on one track is different from the data amount of video data on one track.

Figure 6B:
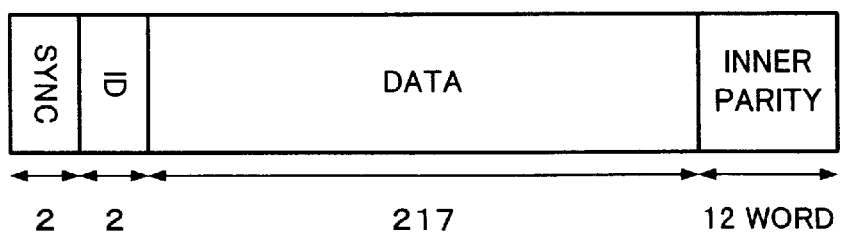

Audio data is encoded with outer code. An encoded output data including an ID is encoded with inner code. Data is obtained in the encoding direction of the inner code. A block sync is added to the resultant data. Thus, one sync block of 233 bytes is obtained as shown in FIG. 6B. In other words, a two-word sync block is added to (2+217+12=231) words of each line of the matrix shown in FIG. 6A. After data of sync blocks is scrambled, the resultant data is recorded on the magnetic tape.

Figure 7A:
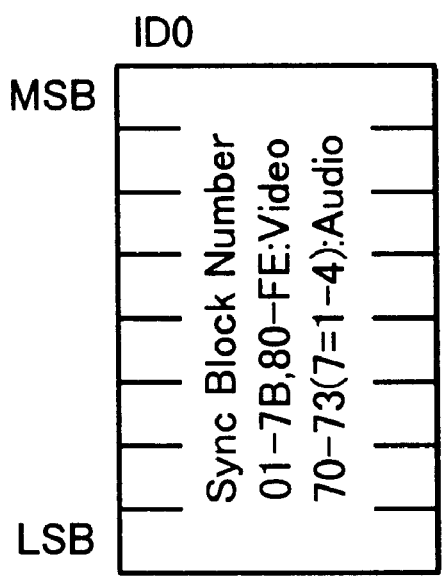
FIGS. 7A and 7B are schematic diagrams showing examples of the structures of ID0 and ID1.
Figure 7B:
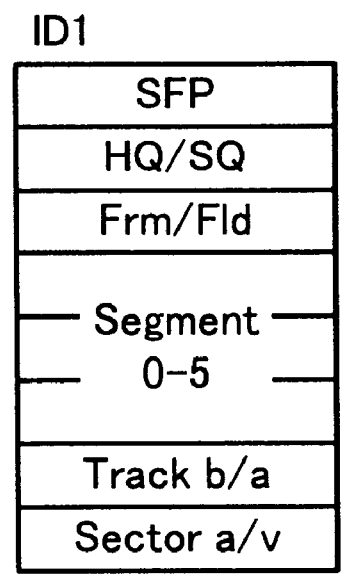

In each sync block, a sync pattern is followed by a two-byte ID (ID0 and ID1). FIGS. 7A and 7B show the structures of ID0 and ID1. ID0 represents a sync block number (see FIG. 7A). Sync blocks on each track are identified with respective sync block numbers. ID1 includes a flag Sector a/v, a track number Track b/a, and segment numbers 0 to 5. The flag Sector a/v distinguishes audio sector/video sector. The track number Track b/a distinguishes an adjacent track with a different azimuth angle. ID1 also includes flags of compression-encoding parameters (intra-frame encoding/intra-field encoding process Frm/Fld, high picture quality/standard picture quality HQ/SQ, and shuffling pattern SFP) (see FIG. 7B).

The first one word (HD) of 217 words of each sync block is a data header. The data header includes information that represents data quantizing characteristics and a one-bit sync error flag.

Next, with reference to FIG. 8, the structure of the ECC decoder 21 or 21 will be described in detail. The structure of the ECC decoder 53 (54) of the eight-head system is the same as the structure shown in FIG. 8 except that the number of input channels of the former is twice as many as that of the later. In FIG. 8, reference numeral 60 represents an IC circuit of the ECC decoder. The ECC decoder IC 60 has an inner code error correcting function, an outer code error correcting function, an audio signal processing function, an error counting function, and an auxiliary data reading function.

Serial data reproduced at a record rate of 94 Mbps and a clock signal generated therefrom are input in parallel to the ECC decoder IC 60. The serial data and the clock signal are supplied to an S/P converter 61. The S/P converter 61 converts the serial data into parallel data of eight bits wide. In addition, the S/P converter 61 divides the frequency of the clock signal by eight.

In this stage, high speed data of one bit wide is converted into low speed data of eight bits wide. Thus, since bytes and sync blocks of data do not vary, a synchronization detecting circuit 62 converts the data into a normal data sequence (with the synchronization detecting function of the synchronization detecting circuit 62). Each byte is detected with a bit assign signal that is output from an output terminal of the synchronization detecting circuit 62. In addition, each sync block is detected with a strobe pulse STB added by the synchronization detecting circuit 62. A rate converter 63 converts 11.7 MHz of the divided clock signal into 46 MHz of the system clock signal.

For dealing with the eight-head system, the ECC decoder IC 60 has two input systems that are a main input system and a sub input system. In the above description, the main input system was described. The structure of the sub input system is the same as the structure of the main input system. As with the main input system, the ECC decoder IC 60 has an S/P converter 65, a synchronization detecting circuit 66, and a rate converter 67 so as to process reproduced data of the sub input system. Data packets that are output from the main input system and the sub input system are supplied to a mixer 68. An OR circuit of the mixer 68 mixes data of two channels into data of one channel. Since a signal at a data rate of 11 Mbps is converted into a signal at a data rate of 46 Mbps, each packet is spaced. Thus, data of the sub input system and data of the main input system can be mixed. However, if data of the sub input system and data of the main input system are unconditionally mixed, they will collide. To prevent data from colliding, the rate converters 63 and 67 synchronously operate so that while one of them is outputting data, the other stops outputting data. In addition, to determine which of the main input system or the sub input system has output a packet, a one-bit flag sub/main is placed in the packet.

The switching pulse SWP is delayed for a delay time period of the inner circuits by a timing generator 64. Likewise, information that represents the tape traveling direction is delayed. Each of the rate converters 63 and 67 places the delayed switching pulse SWP and the delayed information in a packet. Each of the rate converters 63 and 67 has a counter that is reset at a head switching timing and that counts up with the strobe pulse STB. With the counter value of the counter, each of the rate converters 63 and 67 determines whether a non-record portion (referred to as gap) has taken place. Each of the rate converters 63 and 67 places this information in the packet.

The mixer 68 supplies a mixed packet to an inner code decoder 69. The inner code decoder 69 corrects an error of the packet. The inner code decoder 69 places error correction information in a packet. The error correction information represents whether an error is uncorrectable or not and how many bytes were corrected. The resultant packet is supplied to an ID reproducing circuit 71. If the inner code decoder 69 could not correct an error of a packet with inner code, the ID of the packet is unreliable. However, a memory controller 74 (that will be described later) determines a sequence and an order of the outer code error correcting process with reference to the ID. Thus, the ID should be reproduced. The ID reproducing circuit 71 predicts and reproduces an ID of a packet having an uncorrectable error with IDs of adjacent packets whose errors are correctable. Since the ID reproducing circuit 71 references later packets, it has two RAMs for the main input system and the sub input system. Each RAM can store three packets. With the RAMs, the ID reproducing circuit 71 converts data into data of 16 bits wide and synchronizes with a video outer code decoder 76.

The error correction information obtained from the inner code decoder 69 is supplied to an error monitor (not shown). The error monitor encodes the error correction information and other information for each of the main input system and the sub input system, and outputs the resultant signals to the outside of the ECC decoder IC 60. By converting the signals into analog signals, the error correction state can be monitored.

Data that is output from the ID reproducing circuit 71 is supplied to a descrambler 72. The descrambler 72 descrambles data that is output from the ID reproducing circuit 71. Main data that is output from the descrambler 72 is stored in an SDRAM (Synchronous Dynamic Random Access Memory) 75 that is connected as an external device to the ECC decoder IC 60 through a memory controller 74.

At this point, the memory controller 74 controls the timing of data received from the descrambler 72 and addresses of segments of video data and audio data written to the SDRAM 75.

When video data of the main input system is stored for one error correction code block (one track), the memory controller 74 reads the video data from the SDRAM 75 and supplies the video data to a video outer coder decoder 76 that performs an outer code error correcting process. The memory controller 74 writes the resultant data to the SDRAM 75.

The memory controller 74 selects main data/sub data that has been decoded with outer code of one track, reads the selected data in the inner code direction, and supplies the resultant data to an ID renumbering circuit (not shown). The ID renumbering circuit renumbers the ID so as to interface with a compression-decoder. The resultant data is output from a terminal 77.

On the other hand, when audio data for one field (one data unit for the error correction code encoding process) is stored in the SDRAM 75, the memory controller 74 supplies the audio data to an audio processing circuit 78. The audio processing circuit 78 performs predetermined processes such as an outer code error correcting process, a deshuffling process, and an error interpolating process. Thereafter, the audio processing circuit 78 converts parallel data into serial data and outputs the serial data to a terminal 79.

In addition, the ECC decoder IC 60 has an interface 80 that interfaces with a system controlling microcomputer (referred to as system controller). The system controller performs various setting operations to the ECC decoder IC 60 and reads error information from the ECC decoder IC 60 through the interface 80. The ECC decoder IC 60 also has a circuit that extracts video auxiliary data other than video data and a circuit that extracts audio auxiliary data other than audio data. The extracted auxiliary data is supplied to the system controller through the interface 80. Moreover, the ECC decoder IC 60 has an error counter 73 that counts up the number of errors.

The system controller exchanges data with the interface 80, the timing generating circuit 64, the error counter 73, the memory controller 74, the outer code decoder 74, the audio processing circuit 78, and the interface 80 through a bus 81 with a predetermined bit width. Each portion extracts desired data from the bus 81. Data that is read from the interface 80 is supplied to the bus 81.

Figure 9:
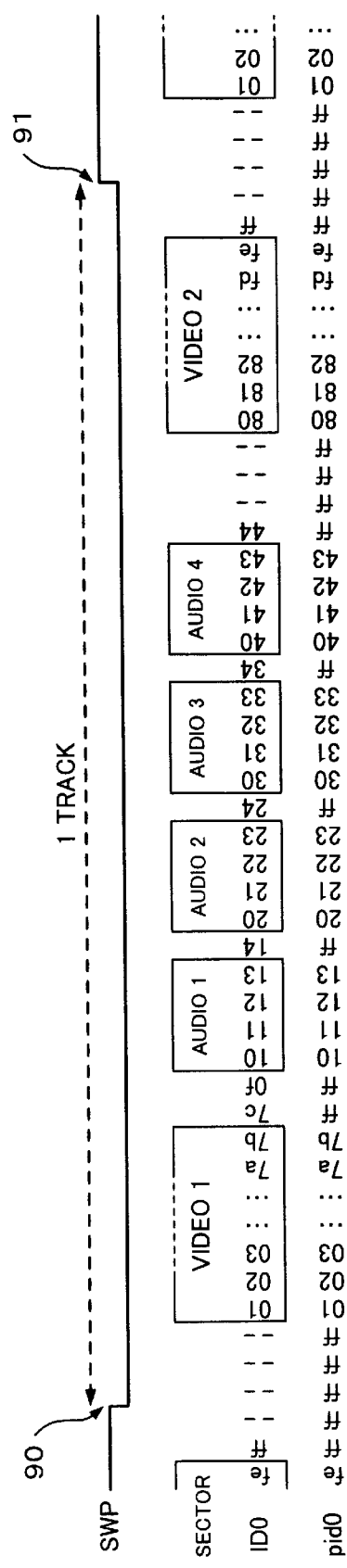
FIG. 9 is a schematic diagram showing a record pattern on a magnetic tape.

Next, with reference to FIGS. 9 to 15, data variation performed until data recorded on the magnetic tape 14 is written to the SDRAM 75 will be described. FIG. 9 shows a record pattern on the magnetic tape 14. As described above (FIG. 5), one track is mainly divided into six sectors. The six sectors are designated sequence numbers ID0 (in hexadecimal notation). A non-record portion (referred to as edit gap) is placed between each sector. The edit gap prevents a sector that is recorded from destroying another sector. Actually, synchronous patterns SYO and SY1 and ID0 and ID1 for detecting synchronization are recorded as an edit gap. When all sectors are recorded, the rest of the track is filled with a sub-Nyquist frequency signal.

Figure 10:
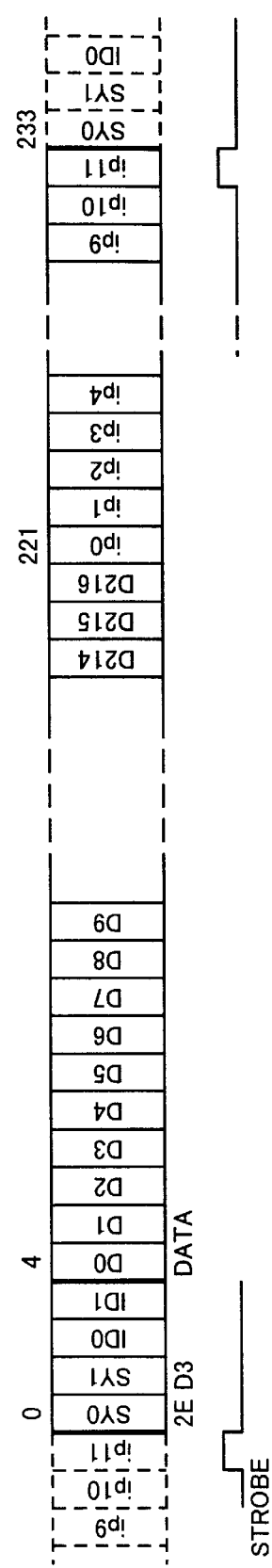
FIG. 10 is a schematic diagram for explaining data variation in the ECC decoder.

When the signal is reproduced and the synchronization is detected by the synchronization detecting circuit 62, a data sequence as shown in FIG. 10 is generated. This data sequence is the same as a data sequence that is recorded on the magnetic tape. The data sequence shown in FIG. 10 has fixed patterns SY0 and SY1, sync block identifications ID0 and ID1, 217 data bytes D0 to D216, and 12-byte inner code correction parities ip0 to ip11.

Figure 11:
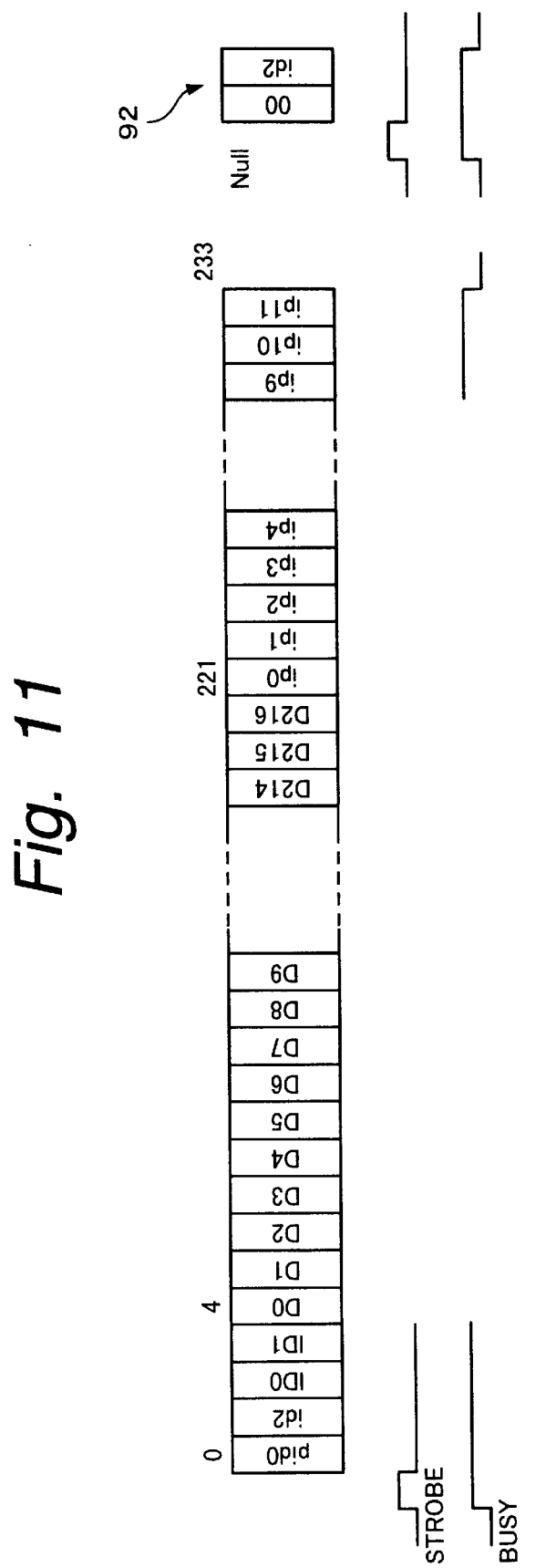
FIG. 11 is a schematic diagram for explaining data variation in the ECC decoder.

The data sequence is supplied to the rate converter 63. In the rate converter 63, since the data rate becomes high, the packets become discontinuous as shown in FIG. 11. In the format shown in FIG. 11, SY0 and SY1 are removed. Instead, pid0 and id2 are placed.

Figure 12A:
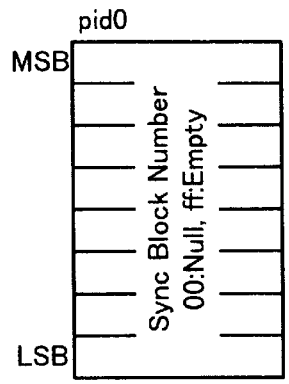
FIGS. 12A, 12B, and 12C are schematic diagrams for explaining the structures of pid0, pid2, and clef.

As shown in FIG. 9, pid0 is an expected value of ID0 corresponding to a time period of the head switching signal SWP. FIG. 12A shows the structure of pid0. Thus, the value of pid0 is basically the same as the value of ID0. However, since pid0 is not necessary in an edit gap region, "ffh" is placed in the edit gap region. "ffh" represents an edit gap region. "h" represents hexadecimal notation. In FIG. 9, "h" is omitted for simplicity.

Figure 12B:
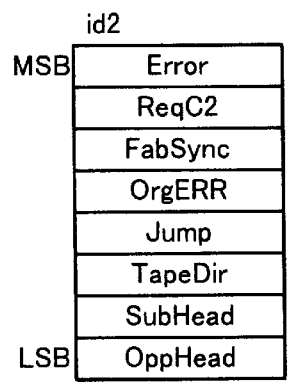

FIG. 12B shows the structure of id2. id2 includes a flag OppHead, a flag SubHead, a flag TapeDir, a flag Jump, and a flag FabSync. The flag OppHead represents a head switching operation. The flag SubHead distinguishes Sub/Main. The flag TapeDir represents a tape traveling direction. The flag FabSync represents whether or not SY0 and SY1 are correct. In this stage, other bits are "0".

Returning to FIG. 11, the rate converter 63 adds a null packet 92 at timings 90 and 91 (see FIG. 9) at the end of each track (namely, corresponding to the switching pulse SWP). With the null packet 92, id2 is sent. As shown in FIG. 11, the null packet 92 is a short packet of two bytes. The null packet 92 is identified with pid0='00h'.

Figure 12C:
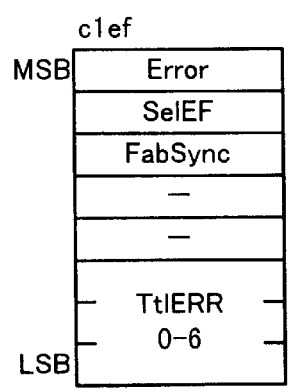
Figure 13:
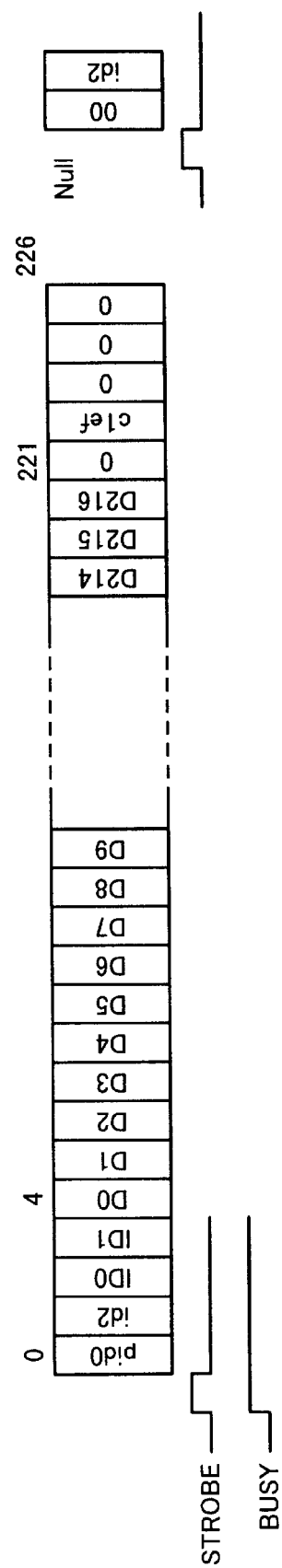
FIG. 13 is a schematic diagram for explaining data variation in the ECC decoder.

Next, the inner code decoder 69 performs an inner code error correcting process and outputs a data sequence as shown in FIG. 13. After the inner code error correcting process has been completed, since ip0 to ip11 are not necessary, they are removed. Instead, the positions of ip0 to ip11 are fulled with '0s'. The result of the inner code error correcting process is clef. clef is placed in the packet. FIG. 12C shows the structure of clef. clef includes a three-bit flag TtlERR, a one-bit flag Error, and a one-bit flag FabSync. The flag TtlERR represents the number of errors that have been corrected with inner code. The flag Error represents an uncorrectable error. The flag FabSync is copied from id2.

Figure 14:
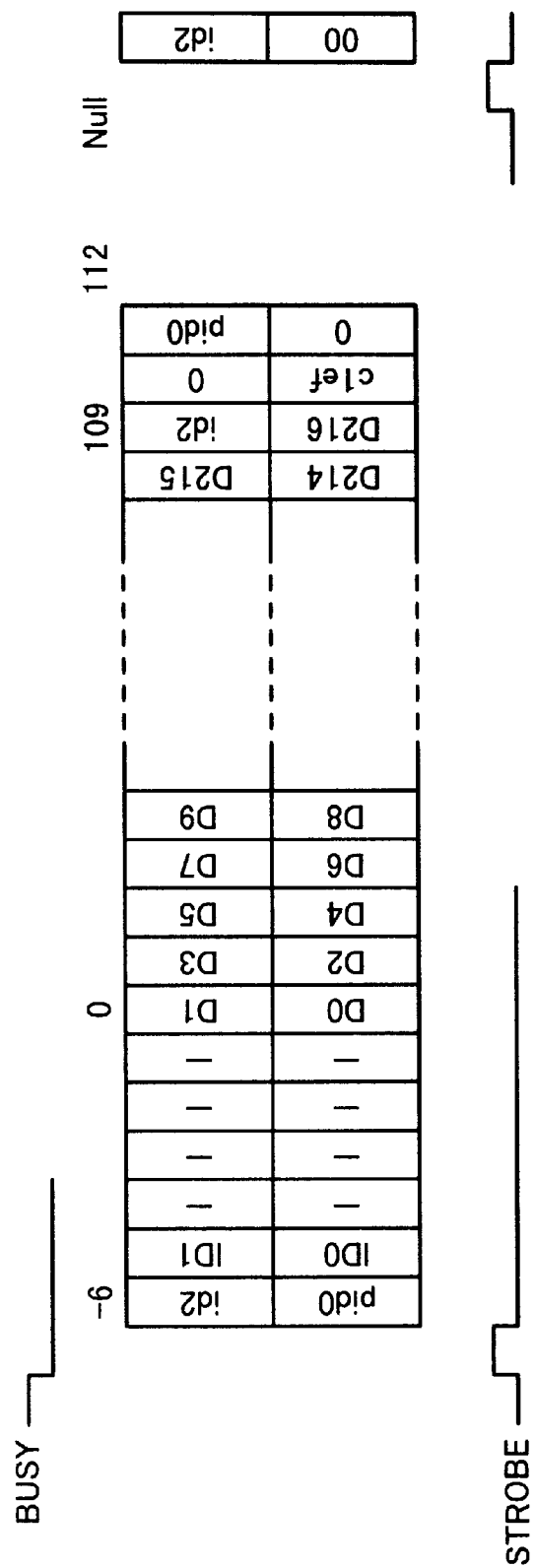
FIG. 14 is a schematic diagram for explaining data variation in the ECC decoder.

The ID reproducing circuit 71 changes the bit width of the data sequence to 16 bits corresponding to the bit width of the SDRAM 75. In addition, the time periods of ID0 and ID1 are prolonged corresponding to a signal Busy received from the memory controller 74 so as to allow the memory controller 74 to calculate an address of the SDRAM 75. FIG. 14 shows the structure of a packet that is output from the ID reproducing circuit 71. In FIG. 14, pid0 and id2 placed at the beginning of the packet are copied to the rear end side of the packet so as to write the packet to the SDRAM 75.

In this example, a flag ReqC2 is added to id2. The flag ReqC2 is used to determine whether or not an outer code error correcting process can be omitted. The ID reproducing circuit 71 detects the continuity of ID0. The ID reproducing circuit 71 has a circuit that obtains ID0 of a packet with an error from ID0 of the preceding packet. The output data of the circuit is treated as an expected value of ID0. If ID0 of a packet whose error has been corrected with inner code is different from the expected value, it is determined that a packet has dropped or a redundant packet has taken place. In such a manner, the continuity of ID0 is detected and the detected result is represented with the flag ReqC2.

Figure 15:
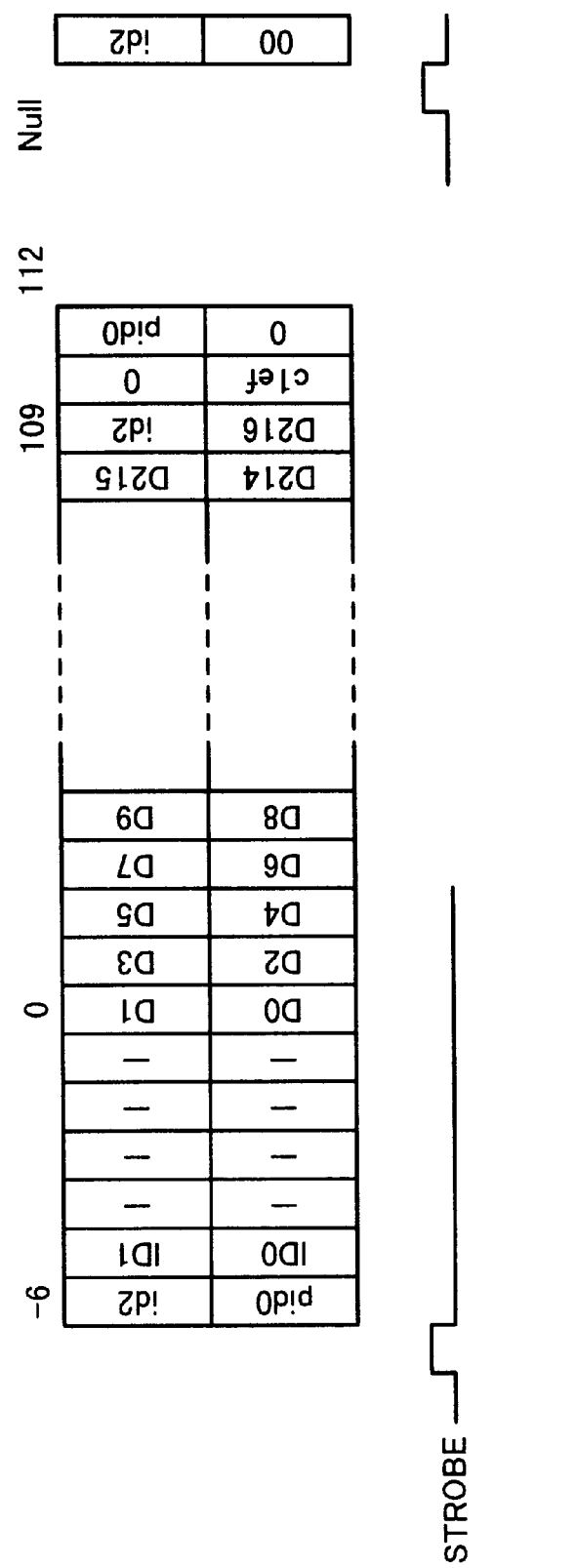
FIG. 15 is a schematic diagram for explaining data variation in the ECC decoder.

To flatten the distribution of the record frequency, the ECC encoder 5 scrambles the data bytes D0 to D216 corresponding to for example the M sequence. The data bytes D0 to D216 that have been scrambled are descrambled by the descrambler 72. FIG. 15 shows the structure of a packet that is output from the descrambler 72. The descrambler 72 places CRCC (Cyclic Redundancy Check Code) for checking the SDRAM 75 to the rear end side of the packet. This packet is stored in the SDRAM 75 through the memory controller 74.

Figure 16:
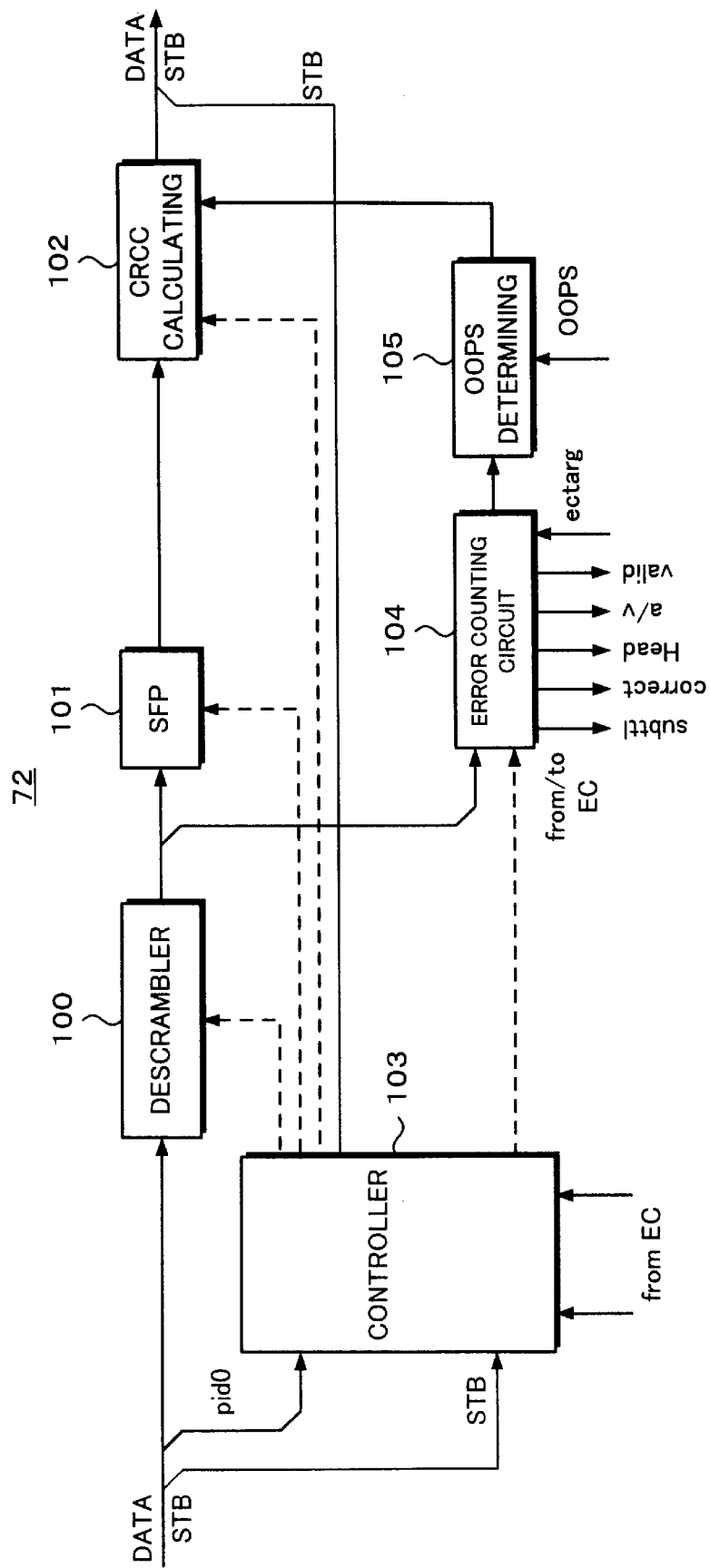
FIG. 16 is a block diagram showing an example of the structure of a descrambler.

Next, the operation of the descrambler 72 will be described. FIG. 16 shows an example of the structure of the descrambler 72. Setup information and so forth that are output from the system controller are supplied to the descrambler 72 through the error counter 73. The setup information that is output from the system controller is denoted by "from EC" in FIG. 16. Likewise, information that is sent to the system controller through the error counter 73 and the interface 80 is denoted by "to EC".

A strobe signal STB is supplied to the descrambler 72 along with the packet. The packet is output through a descrambling circuit 100, an SFP unifying circuit 101, and a CRCC circuit 102. The SFP unifying circuit 101 improves the data update ratio of the variable speed reproducing operation. The CRCC circuit 102 adds the CRCC and the flag ReqC2 to the packet. The detail of the descrambling circuit 100 will be described later.

pid0 and the signal STB extracted from the packet are supplied to a controller 103. In addition, the setup information is supplied from the system controller to the controller 103. The controller 103 controls all operations of the descrambler 72. The controller 103 generates a timing signal and various status signals necessary for the descrambler 72 corresponding to the received signal STB and the setup information received from the system controller. The controller 103 supplies the timing signal to the descramble circuit 100, the SFP unifying circuit 101, the CRCC calculating circuit 102, and the error counting circuit 104. The various status signals are supplied to the SFP unifying circuit 101 and the error counting circuit 104.

A packet that is output from the descramble circuit 100 is supplied to the SFP unifying circuit 101 and the error counting circuit 104. The error counting circuit 104 extracts various error information from the received packet and supplies the extracted error information to the error counter 73.

The error counting circuit 104 extracts SubHead and OppHead from id2 and outputs them as a signal Head. In addition, the error counting circuit 104 extracts LSB from ID1 and outputs it as a signal a/v.

The error counting circuit 104 extracts the flag Error from clef and generates a signal correct that represents a normal sync block. System controller setup information ectarg is supplied to the error counting circuit 104. With the system controller setup information ectarg, an object of the signal correct is selected. Corresponding to conditions of for example "other than edit gap", "no corrected error", "less than n errors (where n=2 to 5)", and "no error in SY0 and SY1", an object of the signal correct is selected. These conditions are extracted from clef of the packet.

Corresponding to the flag TtlERR (representing the number of corrected errors) of clef, a signal subttl that represents the sub total number of errors is generated. Corresponding to the system controller setup information ectarg, the number of bytes other than "0" in the data bytes D0 to D216 of the packet can be counted. Thus, the signal subttl has a bit width of for example eight bits.

These signals Head, a/v, correct, and subttl are supplied to the error counter 73. These signals are updated per packet. Whenever these signals are updated, a signal valid that represents that these signals have been updated is output. The signal valid is supplied as a count pulse to the error counter 73.

The error information extracted by the error counting circuit 104 is supplied to an OOPS determining circuit 105 that determines whether or not the outer code error correcting process is required. System controller setup information OOPS corresponding to reproduction quality is supplied to the OOPS determining circuit 105. Corresponding to the system controller setup information OOPS and the error information received from the error counting circuit 104, a flag ReqC2 is generated. The flag ReqC2 is supplied to the CRCC calculating circuit 102 so as to affect the flag ReqC2 of id2.

As described above, the flag ReqC2 is a flag for causing the memory controller 74 to perform the outer code error correcting process. According to the embodiment of the present invention, in the normal reproducing operation, when both conditions "the packets is continuous" and "no uncorrectable error in inner code error correcting process" are satisfied, the outer code error correcting process is not required. The packet continuity of the former condition is detected by the ID reproducing circuit 71. The later condition is added by the descrambler 72 and placed in ReqC2 as common information in the track.

In such a manner, the OOPS determining circuit 105 extracts ReqC2 added by the ID reproducing circuit 71 for a packet of video data and detects whether or not the packet is continuous. The error counting circuit 104 detects whether or not an error has taken place. When one of conditions "no packet continuity" and "presence of error" is satisfied, an internal flag is set. When both the conditions are satisfied, the inner flag is kept. This evaluation is repeatedly performed in one track. When the track is changed, the internal flag is copied to the register. The internal flag is placed as the flag ReqC2 from the register to the packet. When the flag is placed to the packet, the internal flag is reset.

When at least one packet that does not satisfy the above-described two conditions is present in one track, the flag ReqC2 is set. At this point, the memory controller 74 causes the outer code decoder 76 to perform the outer code error correcting process. The internal flag is provided for each of the main system and the sub system.

At this point, as with the above-described signal correct, a condition "presence of error" can be modified or added corresponding to the system controller setup information OOPS. In this case, as a condition "presence of error", one of conditions "presence of error or an error in SY0 and SY1", "uncorrectable error or n or more corrected errors (where n=2 to 5)", and "only uncorrectable error" can be selected in the order of weaker conditions. When a weaker condition is selected, although the probability of which the outer code error correcting process can be omitted is high, the protection against an incorrect correction in the inner code error correcting process becomes weak.

Next, the descrambling circuit 100 that is the main feature of the present invention will be described. In the embodiment of the present invention, the data width of the SDRAM 75 is 16 bits. On the other hand, since the inner code error correcting process is performed with eight-bit symbols, after the inner code error correcting process is performed, the bit width should be converted from eight bits into 16 bits. As described above, in this example, this conversion is performed with the RAM of the ID reproducing circuit 71. In other words, an extra RAM is not required. Thus, the descrambler 72 disposed downstream of the ID reproducing circuit 71 should handle data of 16 bits wide.

Figures 17A, 17B:
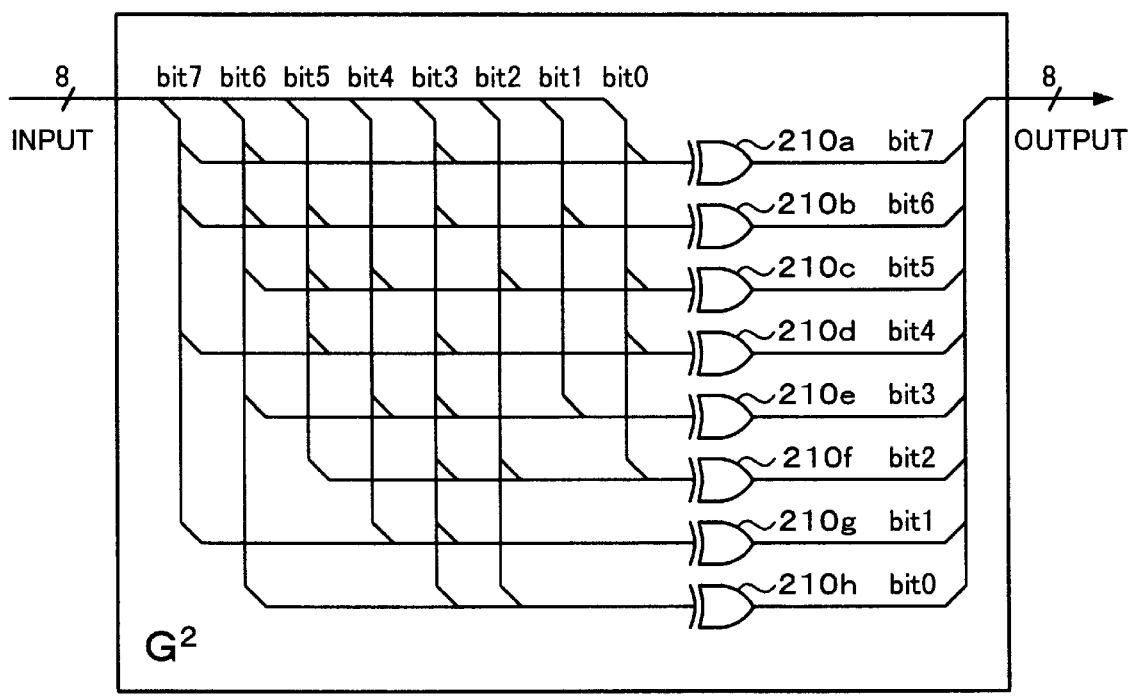
FIG. 17A is a schematic diagram showing the theory of a $G^2$ circuit corresponding to a generated polynomial $G^2$ of which the generated polynomial G is squared.
FIG. 17B is a schematic diagram showing the generated polynomial $G^2$.

In the present invention, to allow the descrambler 72 (descrambling circuit 100) to handle 16-bit data, the generated polynomial G described in the related art reference and shown in FIG. 2B is squared and the resultant generated polynomial $G^2$ is used. FIG. 17B shows the resultant generated polynomial $G^2$. With the circuit shown in FIG. 2A and the circuit equivalent to the equation given by FIG. 17B, the 16-bit data is handled. In FIG. 17A, for simplicity, similar portions to those in FIG. 2A are denoted by similar reference numerals.

FIG. 18 shows the structure of a 16-bit data process performed corresponding to the structures shown in FIGS. 2A and 17A. In FIG. 18, a $G^2$ circuit 113 and a G circuit 114 are equivalent to the circuit shown in FIG. 17A and the circuit shown in FIG. 2A, respectively. In addition, a flip-flop 112 that handles eight-bit data in parallel is equivalent to the flip-flops 200a to 200h shown in FIG. 1.

A packet is divided into high order eight bits and low order eight bits. The high order eight bits are supplied from an input terminal 110b. The low order eight bits are supplied from an input terminal 110a. In addition, the low order eight bits are supplied to a terminal 111a of a switching circuit 111. The switching circuit 111 switches eight-bit parallel data. The switching circuit 111 is controlled with for example a timing signal received from the controller 103. At the beginning of a packet, the switching circuit 111 selects the terminal 111a and obtains ID0 placed at the beginning of the packet. The obtained ID0 is supplied as an initial value of the M sequence to the flip-flop 112. Thus, the start point of the M sequence is designated. Output data of the flip-flop 112 is supplied to both the $G^2$ circuit 113 and the G circuit 114.

In the next cycle, the switching circuit 111 selects a terminal 111b. Thus, the output data of the $G^2$ circuit 113 is supplied to the flip-flop 112. In other words, the output data of the flip-flop 112 is fed back thereto. Consequently, the M sequence of which 16 steps are advanced in one cycle is accomplished.

Eight bits from ninth step to sixteenth step of the M sequence are output from the $G^2$ circuit 113. Eight bits from first step to eighth step of the M sequence are output from the G circuit 114. In addition, the output data of the flip-flop 112 is supplied to the G circuit 114. Eight bits from first step to eighth step of the M sequence are output from the G circuit 114. Thus, the $G^2$ circuit 113 and the G circuit 114 output 16 steps of the M sequence.

Output data of the $G^2$ circuit 113 is supplied to one input terminal of an Ex-OR gate 115 that processes eight bits in parallel. Output data of the Ex-OR gate 115 is supplied to an input terminal 117a of a switching circuit 117. The switching circuit 117 switches eight-bit parallel data. On the other hand, the high order eight bits of the packet received from the terminal 110b is supplied to an input terminal 117b of the switching circuit 117. In addition, the high order eight bits are supplied to the other input terminal of the Ex-OR gate 115. The Ex-OR gate 115 descrambles the high order eight bits of the packet corresponding to ninth step to sixteenth step of the M sequence.

Likewise, output data of the G circuit 114 is supplied to a first input terminal of an Ex-OR gate 116 that processes eight bits in parallel. Output data of the Ex-OR gate 116 is supplied to an input terminal 118a of a switching circuit 118. The switching circuit 118 switches eight-bit parallel data. On the other hand, the low order eight bits of the packet received from the terminal 110a is supplied to an input terminal 118b of the switching circuit 118 and a second input terminal of the Ex-OR gate 116. The Ex-OR gate 116 descrambles the low order eight bits of the packet corresponding to first step to eighth step of the M sequence received to the first input terminal thereof.

In such a manner, the Ex-OR gates 115 and 116 perform descrambling calculations of 16 bits wide. Since the data bytes D0 to D216 of the packet are scrambled, in the period of the data bytes D0 to D216, the switching circuits 117 and 118 are controlled so that output data of the Ex-ORs 115 and 116 are selected. In the other period, the switching circuits 117 and 118 are controlled so that the terminals 110b and 110a are selected. Output data of the switching circuit 117 and output data of the switching circuit 118 are the high order eight bits (output data 119a) and the low order eight bits (output data 119b) of the packet, respectively. The output data 119a and the output data 119b are obtained as main data from the descrambling circuit 100.

In the above-described embodiment, a data compression type digital VCR was described. However, the present invention is not limited to such an embodiment. For example, the present invention can be applied to an apparatus in which data is not compressed. In addition, the drum rotations and/or frame frequency of the above-described apparatus may be varied. The present invention can be applied to any system that transmits data packets and that has an error correcting circuit as well as the above-described VCR.

Moreover, the M sequence of the present invention is not limited to the above-described primitive polynomial. Moreover, the number of degrees of the M sequence may be other than eight.

In the above-described embodiment, two eight-degree circuits ($G^2$ circuit 113 and G circuit 114) are disposed in parallel so as to process 16-bit data in parallel. However, the present invention is not limited to such a structure. When the bit width is an integer multiple of the number of degrees, by increasing the number of elements (rows/lines) of the matrix given by the generated polynomial, the above-described embodiment can be applied. The schematic diagrams shown in FIGS. 17A and 2A are theoretical diagrams. Thus, the structures shown in FIG. 17A and FIG. 2A may be accomplished by a logical compressing operation. For example, the structure shown in FIG. 17A may be accomplished by logically compressing the cascade connections in the structure shown in FIG. 2A. In addition, the circuit shown in FIG. 16 may be modified. For example, each block of the circuit shown in FIG. 16 may be seamlessly structured. In other words, when data is fed back with a circuit corresponding to the generated polynomial G shown in FIG. 2B (namely, data is processed by the circuit twice), the effect of the present invention can be accomplished. When the apparatus is free of timing restriction, two G circuits 114 may be connected in series. In other words, the $G^2$ circuit 113 is omitted. In this structure, the output data of the second G circuit 114 may be fed back to the switching circuit 111. In this case, the structure may be modified by a logical compressing operation.

In addition, according to the above-described embodiment, the descrambling process is performed with the structure shown in FIG. 18. However, the present invention is not limited to such an embodiment. For example, with the same structure, both the scrambling process and the descrambling process can be performed. In addition, the structure shown in FIG. 18 may be used as a simple M sequence generating circuit.

As described above, according to the present invention, the descrambling process (or scrambling process) can be performed with a data-bit width that is different from the degrees of the M sequence.

Thus, the degrees of freedom of the circuit increase. When the data of 16 bits wide is converted into data of eight bits wide, the rate is doubled and the timing adjustment is required. However, according to the present invention, such a problem can be solved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A scrambling apparatus for performing a scrambling process corresponding to a M sequence, comprising:

means for squaring a first matrix of a generated polynomial for generating said M sequence of n degrees, obtaining the result as a second matrix, and treating said M sequence as data of 2n bits wide with said second matrix;

means for supplying an initial value of said M sequence as input data to said first matrix and said second matrix in an initial stage and then supplying output data of said second matrix to said first matrix and said second matrix;

first output means for XORing output data of said first matrix and the low order n bits of the input data and obtaining the result as the low order n bits of the output data of said first output means; and second output means for XORing output data of said second matrix and the high order n bits of the input data and obtaining the result as the high order n bits of the output data of said first output means.

2. A descrambling apparatus for performing a descrambling process corresponding to a M sequence, comprising:

means for squaring a first matrix of a generated polynomial for generating said M sequence of n degrees, obtaining the result as a second matrix, and treating said M sequence as data of 2n bits wide with said second matrix;

means for supplying an initial value of said M sequence as input data to said first matrix and said second matrix in an initial stage and then supplying output data of said second matrix to said first matrix and said second matrix;

first output means for XORing output data of said first matrix and the low order n bits of the input data and obtaining the result as the low order n bits of the output data of said first output means; and second output means for XORing output data of said second matrix and the high order n bits of the input data and obtaining the result as the high order n bits of the output data of said first output means.

3. A scrambling/descrambling apparatus for scrambling and descrambling a 2n bit wide input signal according to a M sequence; said apparatus comprising:

a first matrix processor for processing a plurality of data according to said M sequence into a first output data;

a second matrix processor for processing said plurality of data according to the square of said M sequence into a second output data;

said plurality of data including an initial value of said M sequence, said 2n bit wide input signal, and said second output data;

first output means to XOR said first output data with the lower n bits of said 2n bit wide input signal to form the lower n bits of a 2n bit wide output signal; and second output means to XOR said second output data with the upper n bits of said 2n bit wide input signal to form the upper n bits of a 2n bit wide output signal.

4. A scrambling/descrambling method for scrambling and descrambling a 2n bit wide input video signal according to a M sequence in order to flatten the recording frequency; said method comprising the steps of:

first matrix processing a plurality of data into a first output data according to said M sequence using a first matrix processor;

second matrix processing said plurality of data into a second output data according to the square of said M sequence using a second matrix processor;

said plurality of data including an initial value of said M sequence, said 2n bit wide input video signal, and said second output data;

first XOR processing said first output data with the lower n bits of said 2n bit wide input video signal to form the lower n bits of a 2n bit wide output video signal using a first XOR gate; and second XOR processing said second output data with the upper n bits of said 2n bit wide input video signal to form the upper n bits of a 2n bit wide output video signal using a second XOR gate.

* * * * *